No. 607,837.

J. P. DORAU.
VALVE GEAR FOR ENGINES.
(Application filed Sept. 27, 1897.)

Patented July 26, 1898.

(No Model.)

Witnesses.
O. H. Keeney.
Anna V. Faust.

Inventor.
John P. Dorau.
By Benedict & Morsell.
Attorneys.

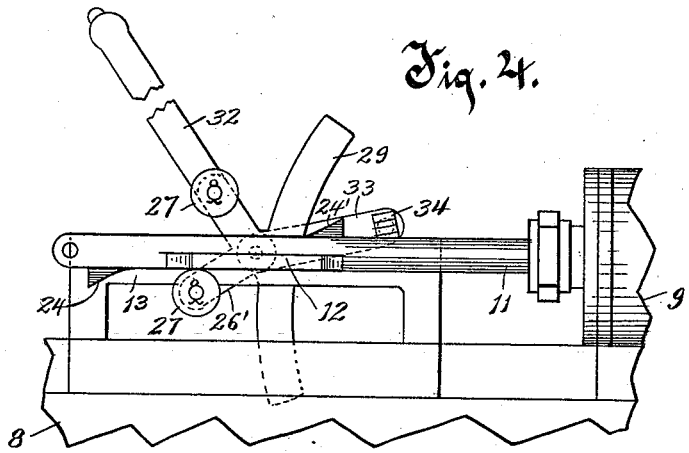
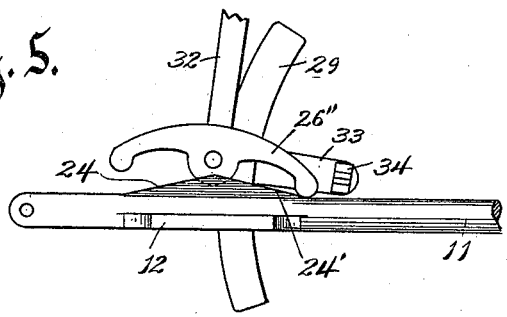
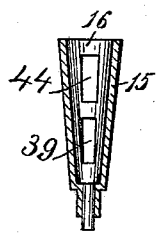
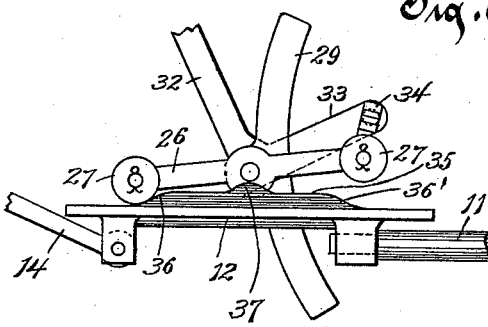

No. 607,837. Patented July 26, 1898.
J. P. DORAU.
VALVE GEAR FOR ENGINES.
(Application filed Sept. 27, 1897.)
(No Model.) 3 Sheets—Sheet 3.
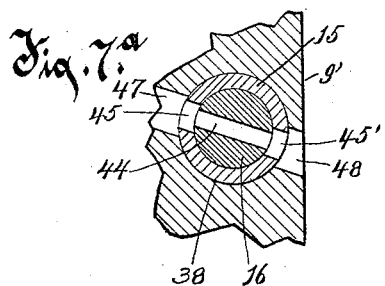
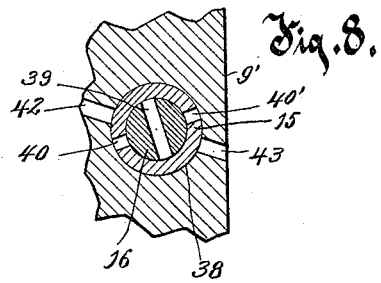
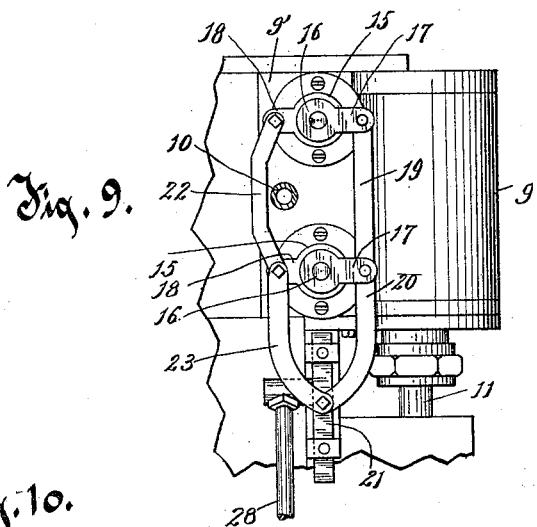
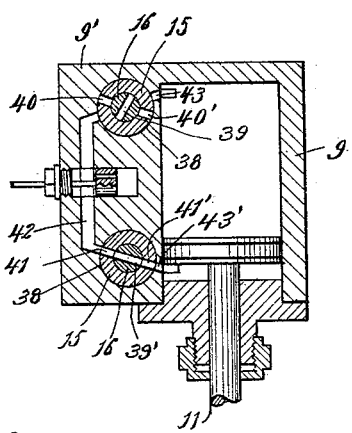
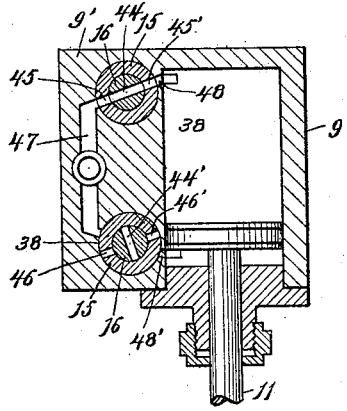
Witnesses.
Inventor.
John P. Dorau
By Benedict & Morsell
Attorneys.

UNITED STATES PATENT OFFICE.

JOHN P. DORAU, OF LARK, WISCONSIN.

VALVE-GEAR FOR ENGINES.

SPECIFICATION forming part of Letters Patent No. 607,837, dated July 26, 1898.

Application filed September 27, 1897. Serial No. 653,202. (No model.)

*To all whom it may concern:*

Be it known that I, JOHN P. DORAU, of Lark, in the county of Brown and State of Wisconsin, have invented a new and useful Improvement in Valve-Gears for Engines, of which the following is a description, reference being had to the accompanying drawings, which are a part of this specification.

My invention has relation to improvements in engines.

It relates more particularly to certain improvements upon the form of engines covered in Letters Patent of the United States issued to me under date of August 3, 1897, and numbered 587,361. In the engine covered by said Letters Patent two sets of valves are used, each set consisting of an outer tubular shell and a therein-fixed cylindrical plug. For operating these valves each cylindrical plug is provided with a crank-arm and each of the tubular shells with a crank-arm, and the free extremities of the respective crank-arms are connected to rods, which rods in turn are connected by other rods to a slide. The patent referred to also shows and describes certain mechanism for operating this slide.

My present invention contemplates certain improvements upon the mechanism for operating the slide above referred to, with the object in view of simplifying the slide-operating mechanism; and with this end in view the invention consists of the devices and parts or their equivalents, as hereinafter more fully set forth.

In the accompanying drawings, Figure 1 is a side elevation of so much of an engine as is necessary to illustrate my improvements, showing one-half of the supporting-frame for the cross-head removed. Fig. 2 is an end elevation of the form of engine shown in Fig. 1, looking to the right of said Fig. 1 and showing the frame in section. Fig. 3 is a side elevation showing a modified form of construction. Fig. 4 is a side elevation showing another modified form of construction. Fig. 5 is a fragmentary detail view of another modified form of valve or slide mechanism. Fig. 6 is a similar view of still another modification in said mechanism. Fig. 7 is an inverted view of the valves of a set, the inner and outer parts thereof being of conical form. Fig. 7ª is a section through the exhaust-ports of the valves of the set shown in Fig. 7 and through the exhaust-ducts in the integral member of the cylinder in which said valves are located, showing the exhaust-ports of the shell and the exhaust-ducts of the integral member as enlarged, the construction being adaptable for the Fig. 6 form. Fig. 8 is a section through the inlet-ports of the valves of a set and through the inlet-ducts in the integral member of the cylinder. Fig. 9 is a fragmentary plan view showing the connections between the valves and the slide. Fig. 10 is a sectional view through the cylinder and its integral member, taken on a plane through the inlet steam or supply ducts and valves; and Fig. 11 is also a horizontal section through the cylinder and its integral member, taken on a plane through the eduction or exhaust ducts and valves, Figs. 10 and 11 being adaptable for all the forms of the drawings excepting the Fig. 6 form.

Referring to the drawings, the numeral 8 indicates the frame or bed on which the engine is mounted. A steam-cylinder 9 is fixed on the bed and is constructed in accordance with the specification forming part of my former Letters Patent hereinbefore referred to— that is to say, with an integral member 9', in which the live-steam ducts and the exhaust-steam ducts are located, which ducts respectively open into and from the steam-cylinder near the ends of said cylinder. The live-steam ducts connect with and open from a supply-pipe 10 and the exhaust-ducts connect with and lead into an exhaust-pipe. A piston reciprocates in the cylinder and is provided with a rod 11, reciprocable endwise through the head of the cylinder in suitable steam-tight packing therefor. This rod is provided with a head or enlargement 12, fitted to and traveling reciprocably in the guides 13 13 therefor, fixed to the bed 8. A pitman or connecting-rod 14, pivoted to the head 12, is at its other extremity wristed on a disk (not shown) carried on a driving-shaft. (Also not shown.) The induction-ducts and the eduction-ducts are substantially alike in form and are located apart in parallel planes in the enlarged member or portion, which is preferably integral with the cylinder 9. In and across these ducts two sets of revoluble valves extend. Each set of valves consists of an outer or tubular shell 15 and a therein-fitted plug 16. The shell and plug I prefer to make of conical form, as this form might in some instances be used to advantage. The shell and plug of each valve are provided with registering ports opposite the induction and the eduction ducts and are so disposed and operated that the ports through the shell and plug of one valve will be open for one of the induction-ducts at a time when the ports in the other valve will be closed to the induction-duct, when at the same time the exact reverse conditions will be present in the disposition and arrangement of the same valves in the eduction-ports. The action is such that the shell rotates or oscillates in one direction, while the plug therein oscillates in the other direction, thus putting the ports through the plug and through the shell out of registration with each other and out of registration with the ducts when shifted in the proper manner.

For operating the cut-off valves each plug is provided with a crank-arm 17, and each of the tubular shells is provided with a crank-arm 18, and the free extremities of the crank-arms 17 are pivoted to a connecting-rod 19, which in turn is attached by a rod 20 to a slide 21, reciprocable endwise in fixed guides therefor. The free extremities of the crank-arms 18 are pivoted to a rod 22, which rod is also connected by a rod 23 to the slide 21.

Referring now particularly to the form shown in Figs. 1 and 2 of the drawings, the head or enlargement 12 of the piston-rod is formed or provided on its under side with a double-beveled surface, one bevel being indicated by the numeral 24 and the other bevel by the numeral 24'. Mounted on a short shaft 25 is the head of an inverted-T-shaped rocking arm 26. At the extremities of the horizontal member of this T-shaped arm are mounted rollers 27 27. To the upper end of the vertical member of the T-shaped arm is pivotally connected a rod 28, the other extremity of said rod being pivotally connected to the slide 21. In the operation of this form of the device if the cylinder is taking steam in the left-hand end, Fig. 1, thereof the piston-rod will move toward the right by the action of the steam against the piston, and as soon as the beveled surface 24' of the head of the piston-rod reaches the roller 27 at one end of the head of the T-shaped rocking arm it will cause a rocking of said arm, so as to throw its upright member toward the end of the cylinder. This engagement of the beveled surface with the roller takes place at about the end of the movement of the piston inwardly, and the effect of such action is to reverse the admission of steam to the cylinder and the exhaust therefrom. The piston now begins its movement in the opposite direction, and as soon as the beveled surface 24 reaches the other roller 27 the rocking T-shaped arm will be rocked in the opposite direction, so as to turn and position the valves in the proper direction to admit steam in the space in advance of the piston and to exhaust from the space to the rear of said piston.

In the form of construction illustrated in Fig. 3 the beveled surfaces 24 and 24' are arranged on the upper side of the head of the piston-rod. The short shaft 25 is also mounted in bearings extending upwardly from the frame. The rocking arm 26 in this form is unprovided with the vertical extension and is mounted medially on the short shaft and carries at opposite extremities the rollers 27 27. Mounted fast on the short shaft is a segmental guide-arm 29, provided with a curved groove 30. If desired, this guide-arm may be secured to or a part of the rocking arm 26. An actuating-rod 30' is connected to the slide 21, and at its other end is provided with a sliding block 31, to which it is pivoted, which block is fitted and adapted to slide in the guideway groove 30 therefor in the segmental guide-arm 29. In this form also I show the rollers 27 as provided with rubber tires 27'. The operation of this form of device is substantially similar to that of the Figs. 1 and 2 form. If the piston-rod is moving outwardly, the bevel 24 thereof will contact with the roller 27 at one end of the rocking arm 26. This will cause a turning of the short shaft and a consequent turning of the segmental guide-arm mounted fast thereon, so as throw the upper end of said guide-arm toward the end of the cylinder, and consequently cause a reversal of the valves. The reverse operation takes place when the rod is moving inwardly, in which case the bevel 24' contacts with the other roller 27 of the rocking arm. The segmental guide-arm is shown in this form of device, so as to provide means for stopping or reversing the engine. A lever-handle 32 is provided, which is pivoted on the short shaft 25. This handle is provided with a projecting arm 33, and this arm is provided with a pivoted stud-pin 34, through which the actuating-rod 30' passes and on which rod the stud-pin slides. The lever-handle is also provided with a spring-actuated latch (not shown) which is adapted to take into a fixed segmental rack (also not shown) in order to lock the lever-handle in position. By means of the lever-handle the engine-driver can shift the sliding block 31 into such position in the segmental guide-arm as desired. To stop the engine, the block 31 is shifted to a point close to the short shaft 25 and in a line from it to the connection between the rod 30' and the slide 21, and for starting or reversing the engine the block 31 is shifted on the arm 29 upwardly or downwardly away from the short shaft 25, the distance to which the block 31 is shifted from the short shaft 25 determining the extent to which the cut-off valves will be open for the admission of steam to the cylinder.

In Fig. 4 I show an arrangement in which one of the beveled surfaces is located below the head of the piston-rod and the other above said head. This arrangement necessitates making the rocking arm 26' of substantially right-angular form, as clearly shown, and mounting the rollers 27 at the extremities of the right-angular projections. This form of device operates in the same manner as that shown in Fig. 3 and may also be provided with the lever-handle 32 for stopping or reversing the engine.

In the form illustrated in Fig. 5 both the beveled surfaces are on the upper side of the head of the piston-rod; but instead of employing rollers at opposite ends of the rocking arm 26'' said rollers are entirely dispensed with and the extremities of the arm, if desired, formed rounded and enlarged.

The Fig. 6 form of construction is such that as the piston is actuated inwardly by the inflowing steam and after said piston has traveled a short distance it completes its stroke entirely by the expansive force of the steam already in the cylinder acting against the piston, further inflow into the cylinder being cut off by reason of the construction and arrangement illustrated in said Fig. 6. From this figure it will be seen that the head of the piston-rod is formed on its upper side with a raised portion or lug 35. The extremities of this raised portion or lug are oppositely beveled, as indicated at 36 36', while the center of the lug is provided with a curved upwardly-extending projection 37. The other parts are similar to the parts illustrated in Fig. 3. It will be supposed that the valve mechanism at one end of the inlet-ducts has been opened and steam admitted against the piston and that the piston has been moved thereby, so as to bring the beveled surface 36 of the piston-rod to the position illustrated in Fig. 6. At this moment said beveled surface begins to act on the roller at the end of the rocking arm and causes a rocking of said arm in a direction to close this valve mechanism. Further inflow into the cylinder is thus cut off, and the piston completes its stroke by the expansive force of the steam which was admitted. The same effect would be produced on the exhaust-valve mechanism, of course, were it not that in this form of construction I contemplate making the ports of the exhaust-valve mechanism much wider than those of the valve mechanism of the inlet-ducts, so that while the piston is being actuated by the expansive force of the steam against one side thereof (the inlet-valve mechanism being closed) yet the exhaust-valve mechanism is not fully closed until the piston has completed its stroke. When the piston-rod has been moved in the direction already referred to sufficiently far to bring the rounded projection 37 into engagement with the roller 27, the turning of the valve mechanism is completed, and consequently a reversal of the valve mechanism occurs, so that steam is admitted against the opposite side of the piston and said piston actuated in an opposite direction until the beveled surface 36' reaches the other roller 27, when of course the inflow of steam is again shut off, and the piston completes its stroke in that direction entirely by the expansive force of the steam, the rounded projection 37 coming in contact with this roller 27 at the completion of the stroke of the piston in this direction, so as to again cause a reversal.

Sheet 3 of the drawings shows clearly the arrangement of the valve mechanism of the several forms of construction and also the connections between the valves and the slide. The outer and inner valves 15 and 16 of each set are shown as fitted in suitable sockets 38 in the enlargement 9'. The inner plugs 16 are intersected, respectively, by the inlet steam-ports 39 39'. Each shell 15 is provided at diametrically opposite points with ports, the ports of one of said shells being indicated by the numerals 40 40' and the ports of the other of said shells by the numerals 41 41'. The ports 40 and 41 are adapted to be brought into register with an inlet-duct 42, while the ports 40' and 41', respectively, are adapted to be brought into register with short ducts 43 43', leading to the cylinder. Each inner plug is also intersected at a point near its lower end with an exhaust-port, the exhaust-port of one of the plugs being indicated by the numeral 44 and the exhaust-port of the other plug by the numeral 44'. On the same plane with these intersecting ports 44 and 44' the outer shells are provided at diametrically opposite points with exhaust-ports. Said exhaust-ports of one of the shells are indicated by the numerals 45 45' and the exhaust-ports of the other shell by the numerals 46 46'. The ports 45 and 46 are adapted to be brought into register with an exhaust-duct 47. The exhaust-ports 45' and 46' are adapted to be brought into register, respectively, with short ducts 48 and 48', leading to the cylinder.

In the several forms shown in all the figures of the drawings excepting Fig. 7$^a$, which is applicable to the Fig. 6 form, the several inlet ports and ducts and outlet ports and ducts are of the same size. The exhaust-ports 45 45' and the ducts 47 and 48 of the Fig. 6 form, however, should be wider than the corresponding ducts and ports of the inlet for the reason before stated. I therefore show in Fig. 7$^a$, which is a section through the exhaust ducts and ports applicable to the Fig. 6 form, the ports 45 45' and the ducts 47 48 much wider than the corresponding parts illustrated in Figs. 8, 10, and 11, which latter are applicable to the several forms of construction shown on the drawings except the Fig. 6 form.

While in the foregoing description I have only referred to "steam" as the medium of power-supply, it will be understood that this engine is also adapted for the use of gas, compressed air, or other analogous expansive fluid medium for producing power.

If desired, the vertical member of the rocking arm 26 may be extended downwardly below said rocking arm, or a downward extension may be provided from the rock-shaft, to which extension a lower link connection, similar to 28, may be secured.

I also do not wish to be understood as restricting myself to the inclines being formed on the cross-head of the piston-rod, as said inclines could be formed on the rocking arms, if preferred, and a projection or wheel provided on the cross-head or piston-rod for contacting with the inclines. It is obvious that this would work equally as well as where the inclines are formed on the cross-head.

What I claim as my invention is—

1. In an engine, the combination, of a cylinder provided with a member having induction and eduction ducts, a piston reciprocable within the cylinder, a piston-rod and a rocking arm, one of said parts provided with two contacting surfaces, whereby said rocking arm is rocked in opposite directions as the piston-rod is reciprocated, valves passing through and controlling one or more of the ducts, each of which valves consisting of a tubular shell and a revoluble cylindrical plug, having ports registering with each other and with the ducts aforesaid, a crank-arm on said tubular shell and on said plug, respectively, a connecting-rod secured to the crank-arm of the tubular shell, another connecting-rod secured to the crank-arm of the plug, a slide, connections between said slide and the connecting-rods of the shell and plug, an arm extending from the rock-shaft, and a connection between said arm and the slide.

2. In an engine, the combination, of a cylinder provided with a member having induction and eduction ports, the eduction-ports being wider than the induction-ports, a piston-rod provided on its upper surface with a raised portion or lug, said raised portion or lug having its ends oppositely beveled and provided medially with an upwardly-extending projection, an arm adapted to be rocked to a limited extent by the opposite inclines at the ends of the raised portion of the valve-rod, as the valve-rod is reciprocated in opposite directions, and to be rocked to its full extent when the medial upwardly-extending projection of the valve-rod contacts with the opposite ends of the rocking arm, on the opposite reciprocations of the valve-rod, valves for controlling the induction and eduction ports, and connections between said valves and the rocking arm.

In testimony whereof I affix my signature in presence of two witnesses.

JOHN P. DORAU.

Witnesses:
ARTHUR L. MORSELL,
ANNA V. FAUST.